June 15, 1954     P. SCHLUMBOHM     2,681,154
FILTER-POT
Filed Oct. 3, 1951
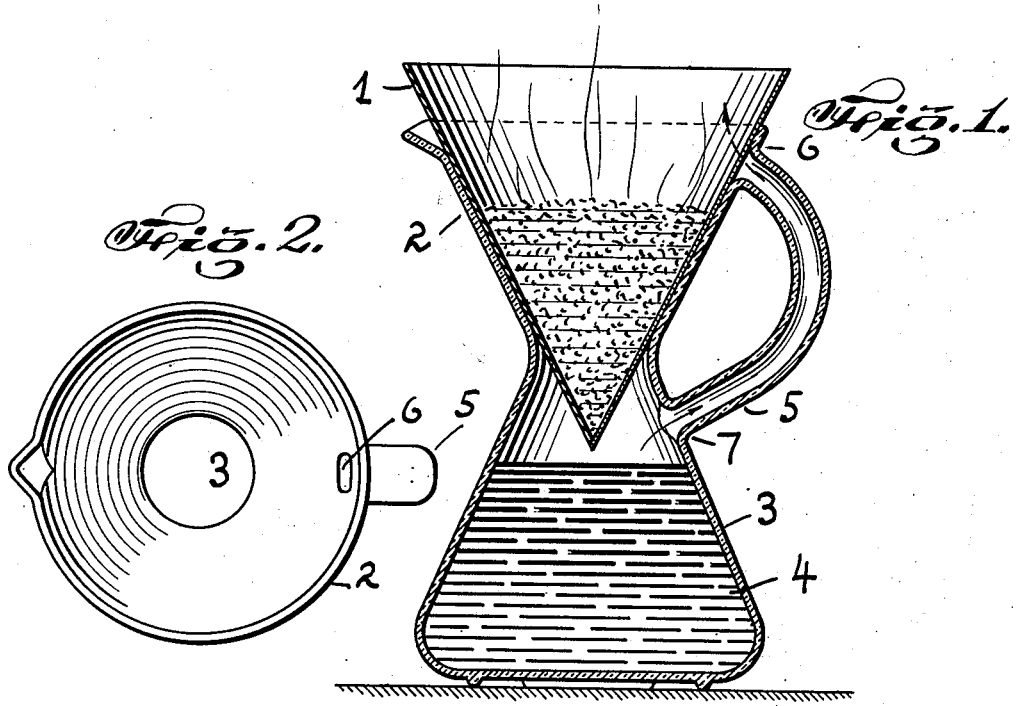
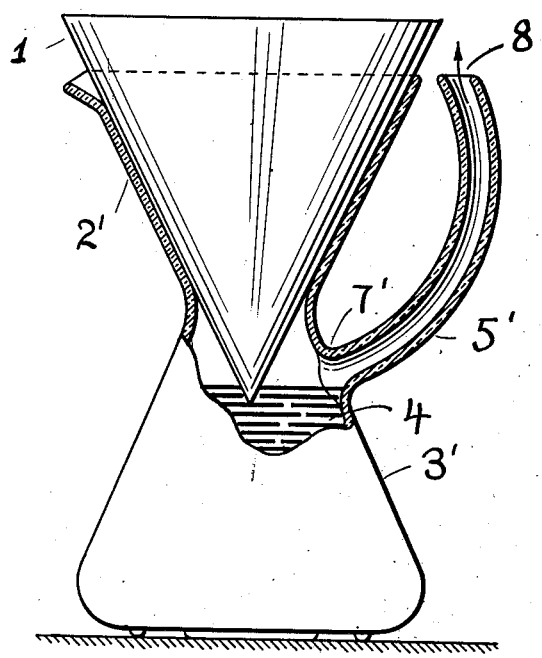
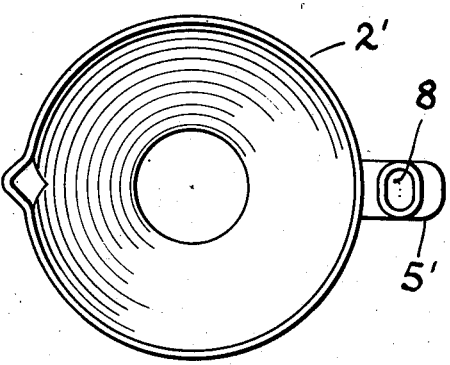
INVENTOR.

Patented June 15, 1954

2,681,154

UNITED STATES PATENT OFFICE 2,681,154

FILTER-POT

Peter Schlumbohm, New York, N. Y.

Application October 3, 1951, Serial No. 249,538

2 Claims. (Cl. 210—160)

The present invention refers to a filtering device, more specifically the invention refers to a filtering device of the type described in my U. S. Patent 2,241,368 and in my U. S. Patent 2,359,943. In this type of filtering device, a funnel for supporting a paper filter and a filtrate flask for receiving the filtrate are built as one single piece. To make such a filtering device operative, the filtrate flask must be vented to allow the air to escape when displaced by the filtrate. In my previous patents I have shown various venting means and the present invention provides new venting means. The invention is shown, by way of example, in Figure 1 to Figure 4 of the accompanying drawings.

Figure 1 is a vertical section of the filtering device and the filtering means.

Figure 2 is a top view of the filtering device shown in Figure 1, with the filtering means removed.

Figure 3 is a side view, shown partly in view, partly in vertical section, of a modification of the filtering device, with filtering means inserted.

Figure 4 is a top view of the filtering device shown in Figure 3, with the filtering means removed.

In Figure 1 the filtering device comprises an upper section 2 which constitutes the filter funnel for receiving the filter cone 1 and the filtrate flask section 3 which is shaped in the form of an Erlenmeier. Section 2 and section 3 are formed as one piece. A handle 5 is formed by a tubular element which is joined to an opening 7 in the wall of the lower section 2 and to an opening 6 in the wall of the funnel section 2. When the filtrate 4, for instance coffee or tea, is dripping from the filter 1, the air in the flask section 3 of the filtering device is displaced and can leave, as the arrow shows, through said opening 7, said tubular handle 5, and said opening 6. The opening 6 is near the edge of the funnel section 2; and a very small hydro-static pressure of the liquid inside the filter 1 will suffice to press the air through the space between the edge of the funnel 2 and the wall of the filter cone 1 at that spot.

The modification shown in Figures 3 and 4 differs from the modification shown in Figures 1 and 2 by letting the handle 5' begin at the opening 7' and end with a free opening 8, without joining the walls of section 2'.

Insulating means for the tubular handles 5—5' may be provided to protect the hand against the heat of the condensing steam of the filtrate 4. The arrangement shown in Figure 3 could be further modified by changing the design of the tubular element 5', for instance by shaping it to form an ascending spiral path so that the hand may have a better and colder grip, as the steam would condense in the lower section of said spiral path.

These new venting means allow a simplification in manufacturing the device. In glass a paste-mould can be used instead of a hot-iron-mould. Manufacturing the concentrical body of section 2 and 3 is simple in ceramics. Spinning metal is also simplified by this design.

Having now described the nature of my invention and shown by way of examples the manner in which it may be performed, I claim as my invention:

1. In a filter-pot of the type including a container formed with an upper funnel portion for receiving a funnel-shaped filter and a flask portion integrally joined to said funnel portion at the reduced end thereof thereby forming a narrow neck section, said flask portion receiving filtrate from said filter during the filtering operation, and said funnel portion being employed as the means for pouring said filtrate during the dispensing operation, the improvement comprising venting means for venting air to atmosphere from said flask portion and condensing vapors escaping from said flask portion during the filtering operation, said venting and condensing means comprising a tube which is joined to said flask portion at the upper end thereof adjacent said narrow section and extending upwardly from said flask portion, said tube venting to atmosphere air trapped in said flask portion as the filtrate is filtered into said flask portion thereby providing for complete filtering action, said tube further forming a handle for lifting said container when the filtrate is dispensed.

2. In a filter-pot of the type including a container formed with an upper funnel portion for receiving a funnel-shaped filter paper and a flask portion integrally joined to said funnel portion at the reduced end thereof, thereby forming a narrow neck section, said flask portion receiving filtrate from said filter during the filtering operation and said funnel portion being employed as the means for pouring said filtrate during the dispensing operation, the improvement comprising venting means for venting air to atmosphere from said flask portion and condensing vapors escaping from said flask portion during the filtering operation, said venting and condensing means comprising a tube which is joined to said flask portion at the upper end thereof adjacent said narrow neck section and extending upwardly from said flask portion and joining said funnel portion at the upper end thereof, said tube venting to atmosphere air trapped in said flask portion as the filtrate is filtered into said flask portion thereby providing for complete filtering action, said tube further forming a handle for lifting said container when the filtrate is dispensed.

References Cited in the file of this patent

UNITED STATES PATENTS

| Number | Name | Date |
|---|---|---|
| 1,655,014 | Herring | Jan. 3, 1928 |
| 2,241,368 | Schlumbohm | May 6, 1941 |
| 2,449,238 | Lightfoot, Jr. | Sept. 14, 1948 |